(12) United States Patent
Gaetano, Jr.

(10) Patent No.: US 9,769,216 B2
(45) Date of Patent: Sep. 19, 2017

(54) COLLABORATION HANDOFF

(71) Applicant: Arthur Louis Gaetano, Jr., Chandler, AZ (US)

(72) Inventor: Arthur Louis Gaetano, Jr., Chandler, AZ (US)

(73) Assignee: Mitel Networks Corporation, Ottawa Ontario (CA)

( * ) Notice: Subject to any disclaimer, the term of this patent is extended or adjusted under 35 U.S.C. 154(b) by 578 days.

(21) Appl. No.: 13/690,687

(22) Filed: Nov. 30, 2012

(65) Prior Publication Data

US 2014/0156854 A1    Jun. 5, 2014

(51) Int. Cl.
| | |
|---|---|
| *G06F 15/16* | (2006.01) |
| *H04L 29/06* | (2006.01) |
| *H04W 76/00* | (2009.01) |
| *H04W 36/00* | (2009.01) |
| *H04W 76/04* | (2009.01) |

(52) U.S. Cl.
CPC ...... *H04L 65/1069* (2013.01); *H04L 65/1086* (2013.01); *H04L 65/1093* (2013.01); *H04L 65/1096* (2013.01); *H04L 65/403* (2013.01); *H04W 76/002* (2013.01); *H04W 36/0011* (2013.01); *H04W 76/04* (2013.01)

(58) Field of Classification Search
CPC . H04L 29/06; H04L 65/1069; H04L 65/1086; H04L 65/1093; H04L 65/1096; H04L 65/403; H04W 36/00; H04W 36/0011; H04W 76/002; H04W 76/04
USPC ......................................................... 709/227
See application file for complete search history.

(56) References Cited

U.S. PATENT DOCUMENTS

| | | | | |
|---|---|---|---|---|
| 7,933,269 | B2* | 4/2011 | Cheng et al. | 370/390 |
| 8,036,175 | B2* | 10/2011 | Suh | H04W 36/0022 370/331 |
| 8,739,045 | B2* | 5/2014 | Pang | 715/753 |
| 2002/0085029 | A1* | 7/2002 | Ghani | 345/751 |

(Continued)

FOREIGN PATENT DOCUMENTS

| | | |
|---|---|---|
| EP | 2007101 A1 | 12/2008 |
| EP | 2093968 A1 | 8/2009 |
| WO | WO 2012/059961 A1 | 5/2012 |

OTHER PUBLICATIONS

Jiejun Kong ; Phan, T. ; Cheng, F. ; Guy, R. ; Bagrodia, R. ; Gerla, M. ; Songwu Lu , A security architecture for application session handoff, 2002, IEEE, Communications, 2002. ICC 2002. IEEE International Conference on (vol. 4 ), pp. 2058-2063.*

(Continued)

*Primary Examiner* — Tonia L Dollinger
*Assistant Examiner* — Dixon Dabipi

(57) ABSTRACT

A collaboration handoff method for seamlessly passing a communication session between devices includes connecting a first device and a second device to enable communication between the first and second devices using an intermediary device to initiate a communication session. A request may be received from one of the first device and a third device to switch to the third device for communication with the second device. Communication session data for the first device may be identified at the intermediary device. The third device may be connected with the second device within the communication session and the communication session data may be transmitted to the third device.

14 Claims, 10 Drawing Sheets

(56) References Cited

U.S. PATENT DOCUMENTS

| | | | | |
|---|---|---|---|---|
| 2007/0058637 | A1* | 3/2007 | Lo | 370/395.2 |
| 2007/0234048 | A1* | 10/2007 | Ziv | 713/159 |
| 2009/0034534 | A1* | 2/2009 | Faccin | H04L 65/1089 370/395.52 |
| 2009/0259758 | A1* | 10/2009 | Chen et al. | 709/228 |
| 2010/0215036 | A1* | 8/2010 | Eom et al. | 370/352 |
| 2010/0279266 | A1* | 11/2010 | Laine | G06Q 10/10 434/350 |

OTHER PUBLICATIONS

Phan, T.; Kaixin Xu; Guy, R.; Bagrodia, R., Handoff of application sessions across time and space, 2001, IEEE, Communications, 2001. ICC 2001. IEEE International Conference on (vol. 5), pp. 1367-1372.*

* cited by examiner

COLLABORATION HANDOFF

BACKGROUND

The Internet and other technologies have enabled low cost and nearly instantaneous sharing of ideas, knowledge, effort and skills. As a result, collaborative work involving the sharing of ideas, knowledge, effort and skills has become easier. Groups of individuals can be formed from individuals desiring to collaborate and results of collaborative efforts can be communicated and tested among the individuals over a network.

Collaboration in terms of computing technology may broadly encompass tools that enable groups of individuals to work together in formats such as social networking, instant messaging, team spaces, web sharing, audio conferencing, video, telephony and so forth. In other words, collaboration may be implemented in a variety of different contexts or applications which may have varying degrees of complexity. Technology that facilitates linking of two or more individuals together to enable the individuals to work together may generally be considered collaborative. Collaborative tools and strategies have been developed by enterprises and others to allow employees, customers and partners to connect and interact in improved and efficient ways.

As non-limiting examples, some collaboration tools facilitate document production, staff networking, expert recommendations, information sharing, expertise location, peer feedback, real-time video or audio conferences and so forth. Collaboration may be performed asynchronously and/or synchronously to facilitate web conferencing, IP (Internet Protocol) telephony, instant messaging, rich video interaction and so forth.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
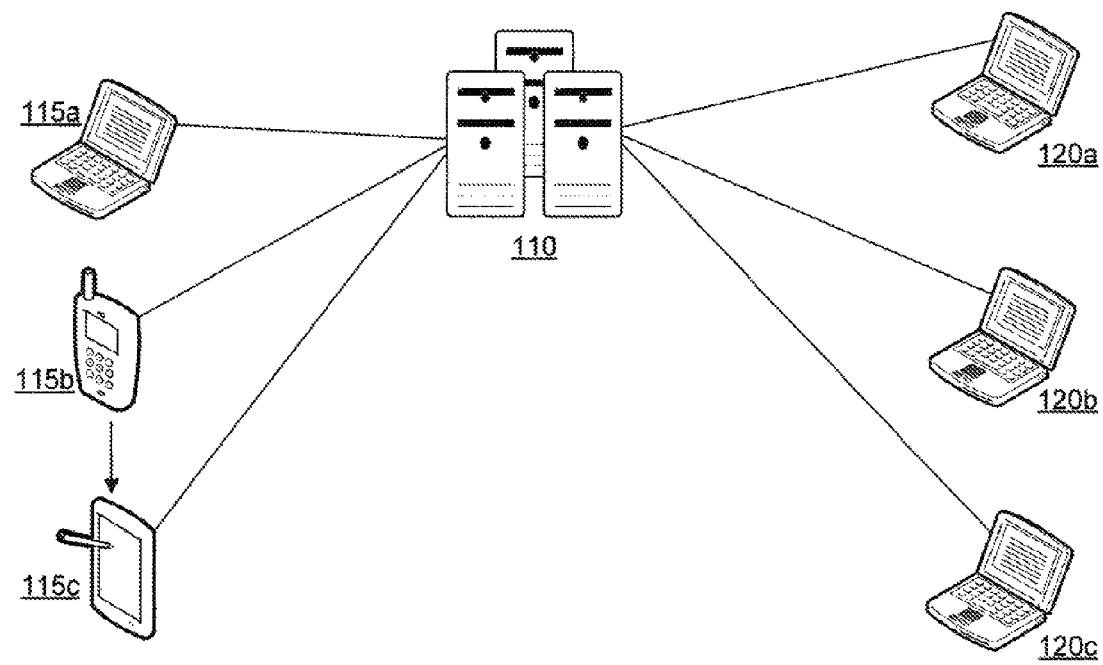
FIG. 1a illustrates a block diagram of a collaboration session handoff in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

With the general examples set forth herein, it is noted in the present disclosure that when describing the system, or the related devices or methods, individual or separate descriptions of systems, methods and so forth are considered applicable to one other, whether or not explicitly discussed in the context of a particular example or embodiment. For example, in discussing a device per se, other device, system, and/or method embodiments are also included in such discussions, and vice versa.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, an "application" refers to coded instructions executable by a processor which can be used to perform singular or multiple related specific tasks. For example, an application may include enterprise software, accounting software, office suites, graphics software, and media players. "Application" does not refer to system software or middleware which manages and integrates a computer's capabilities or to operating systems. Also, an "application" is typically an independently operable application. For example, an enterprise system may manage other applications. The other applications can be accessed and operated within or from the enterprise system. However, the other applications are typically applications which can also be operated independently of the enterprise system or are applications which were developed separately from the enterprise system and subsequently integrated into the enterprise system.

As used herein, a "session" (as in a "collaboration session") may be a semi-permanent interactive information interchange, such as a dialogue, a conversation or a meeting, between two or more communicating devices, or between a computing device and a user. While the session may be semi-permanent, the session may be established or terminated at will by one or more users participating in the session. The session may involve communications in multiple directions, such as back and forth between two users for example. Sessions may be stateful or stateless where information may be stored or not regarding the session history in order to better facilitate communications between the user device and devices of other participants. The session may be performed over wired communications or over wireless communications.

A session may be a TCP (Transmission Control Protocol) session an HTTP (HyperText Transfer Protocol) session or other suitable type of session. The session may be a server side session or a client side session. A session may involve the use of a unique identifier or token specific to and capable of identifying the current interaction session. For example, the client may store and send the token as an HTTP cookie and/or sends the token as a parameter in GET or POST queries. The session may be a desktop session, a browser session, a web server session or any other suitable type of session capable of being used for collaboration.

EXAMPLE EMBODIMENTS

Referring to FIG. 1a, a user may join a collaboration session with audio, video, chat and/or sharing using a telephone or smartphone 115b, laptop 115a, tablet 115c, desktop or other computing device (i.e., "client", "client device" or "client computing device"). If the user is away from the user's desk or office and returns to the office, or alternatively if the user is at the office and subsequently leaves the office, the user may wish to move the collaboration session between devices, such as from a smartphone 115b to a desktop or from a laptop 115a to a tablet 115c. Changing devices using conventional collaboration session handoff technologies typically requires exiting the session on one device, and rejoining the session on another device as a new participant, including re-announcing the new participant. This announcement may disrupt or distract from the conference. Further, conventional collaboration session technologies may request the user to re-enter access codes or other similar information and may result in a loss of public and/or private chat history and other data.

For example, when a user wishes to switch devices during a collaboration session using conventional technologies the user may go to the other client device 115c and manually rejoin the collaboration session as a new participant and then terminate the session from the original client 115b. Alternately, the user may terminate the session from the original client and then initiate the collaboration session as a new participant from the other client device. In either scenario, these actions cause the user to appear to the others in the collaboration session as a new participant. Names of new participants may be announced or displayed or the collaboration server may play an audio tone to the participants of the collaboration session when a new participant joins the session. This may be disruptive to the collaboration session, particularly where the other participants already knew the user was participating and may not know or understand why the user is switching devices or why the collaboration server has re-announced the user. Additionally, the user may be asked to re-enter an access code, PIN or other security information to validate the user to join the collaboration session from the other device. For collaboration sessions with full collaboration (such as including chat and content sharing), the user may lose private and public chat histories when rejoining the session. If the user is recording the session, the recording may stop when switching devices or may result as two separate recordings. If settings are applied to the collaboration session, such as muting of audio and/or video, then such settings may not be carried over when the user switches devices and the user may wish to reapply the settings on the new client device to continue a similar experience as was available on the original device.

The present technology provides various benefits for improving the ease of handing off a collaboration session from one device to another while addressing shortcomings of conventional technologies. For example, while on a collaboration session with video, chat and sharing, the user can identify and select another one of the user's client devices 115c and select a handoff option to initiate a handoff to the device as in FIG. 1b. The new client 115c may receive an invitation to the collaboration session including a join option as in FIG. 1c. If the user selects the join option, the collaboration session may be seamlessly moved to the new device, including transfer of chat history, video layouts, conference settings (e.g., muted parties, and recording status) and so forth as may be applicable to a particular collaboration session. A notification may not be provided to other participants 120a-120c of the collaboration session that the user has moved to a new device. Further, because the user may have already been participating in the collaboration session, a notification may not be provided to the other participants of the collaboration session that a new participant has joined the collaboration session. The present technology may further enable the user to avoid re-entering a name, PIN, passcode or other security credentials when transferring the collaboration session between devices.

The present technology may enable a user to seamlessly move a collaboration session with video, chat, sharing or other features from one device 115b to another device 115c without leaving the session or disrupting the session with an announced name or tone. If the session provides full collaboration (such as including chat and sharing), the user may not lose private and public chat history when handing off the session between the devices. If the user is recording the session, the recording may continue and result as a single recording. Existing current collaboration settings may be maintained after the handoff (e.g., if the user is muted or if the user is muting one or more of the other participants).

The present technology thus enables seamless transfer of a collaboration session from one device 115b to another 115c without disrupting the current collaboration session or losing the current session settings and state. The collaboration session may be using one or more collaboration technologies selected from the group comprising: audio, video, public chat, private chat and desktop, application sharing or white boarding and so forth. The collaboration session may be hosted by a collaboration server 110 or a unified communications server with a collaboration component (UCC server), or may be hosted by two or more separate servers, such as a collaboration server and a unified communications server.

An example illustration of the present technology will now be described where a user is connected to a collaboration session via a client device (laptop 115a, smartphone 115b, tablet 115c, etc.). The user may have entered a PIN or announced the user's name before entering the collaboration session. The other participants 120a-120c in the collaboration session may have heard a tone when the user initially entered the collaboration session. The user's client device may be receiving and/or transmitting audio. The client device may be receiving and/or transmitting video. The client device may be receiving desktop or application sharing (collaboration) from another participant. The session may have public and private chat. The client device may be recording the session. The client device may be muting their audio or video. The client device may be muting the audio and video of some of the other participants. The leader of the collaboration session may be muting the client device. In such an example, the user may wish to move the collaboration session to another device without changing the current settings and state or disrupting the current collaboration session.

Figure 1B:
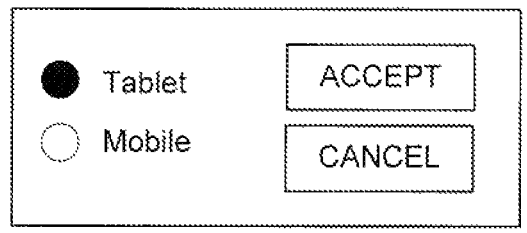
FIGS. 1b-1d illustrate user interfaces presented to users at devices to initiate, accept and cancel handoff requests for handing off a collaboration session between devices in accordance with embodiments of the present invention.
Figure 1C:
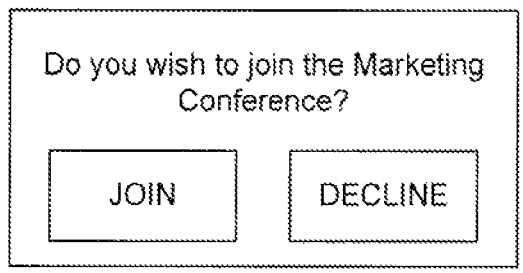

In this example, the user may request to handoff the collaboration session by pressing a handoff button on the client device 115b, as in FIG. 1b. The client device may request from the collaboration server 110 a list of devices that belong to the user (or through which the user has accessed, registered with or logged on to the collaboration server). The collaboration server may return a list of user devices (see FIG. 1b), which may specifically indicate or list user devices which are currently logged in to the server or otherwise "online". Particularly, if one or more of the user's client devices are incompatible with the type of session, the collaboration server may exclude such devices from the list presented to the user. For example, the online user devices may include a telephone capable of audio, a tablet computing device and/or a laptop capable of audio, video, etc. If the conference includes a video component, the collaboration server may recognize the telephone as incapable of providing the video component and the telephone may be excluded from the list presented to the user. In accordance with another embodiment of the present technology, a portion of the collaboration session may be handed off to a device capable of handling that portion of the session even if the device is incapable of handling other portions of the session, as will be described in additional detail later.

Figure 1D:
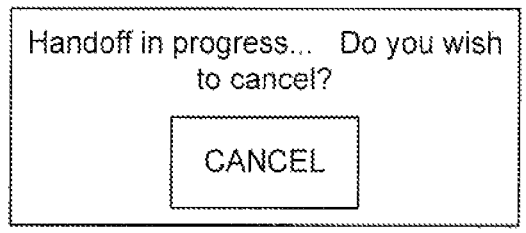

The collaboration server 110 may provide the list of available devices to the user via the user's client device 115*b* to enable the user to select a device from the list. The user may select a device and a handoff or accept selection option as in FIG. 1*b*. The client device may then send a handoff request to the collaboration server with the user's device selection. The server may in turn transmit the handoff request to the selected device 115*c*. The new or selected client device may display a prompt as in FIG. 1*c* enabling the user to join or decline the handoff to the collaboration session, which collaboration session may be identified by name, identification number or the like. During the handoff, the original client device may display a window that indicates to the user that the handoff is in progress and may further provide a cancel option to allow the user to cancel the handoff, as illustrated in FIG. 1*d*.

If the user on the new client selects the join option presented from the collaboration server, then the new client may send an acknowledgement message to the collaboration server. The collaboration server may in turn send the acknowledgement message to the original client device. The original client device may send local session data to the collaboration server. The collaboration server may combine the session data from the original client with server session data and sends the combined session data to the new client. The new client may send a message to the collaboration server to indicate that the handoff was successful. The collaboration server may subsequently send a message to the original client to indicate that the handoff was successful.

If the user selects the option to decline the handoff at the new client, then the handoff may be cancelled and the display window on the original client that a handoff is in progress may be removed. If the user selects the cancel option at the original client, then the handoff may be cancelled and both handoff progress displays on the original and new clients may be removed.

Figure 2:
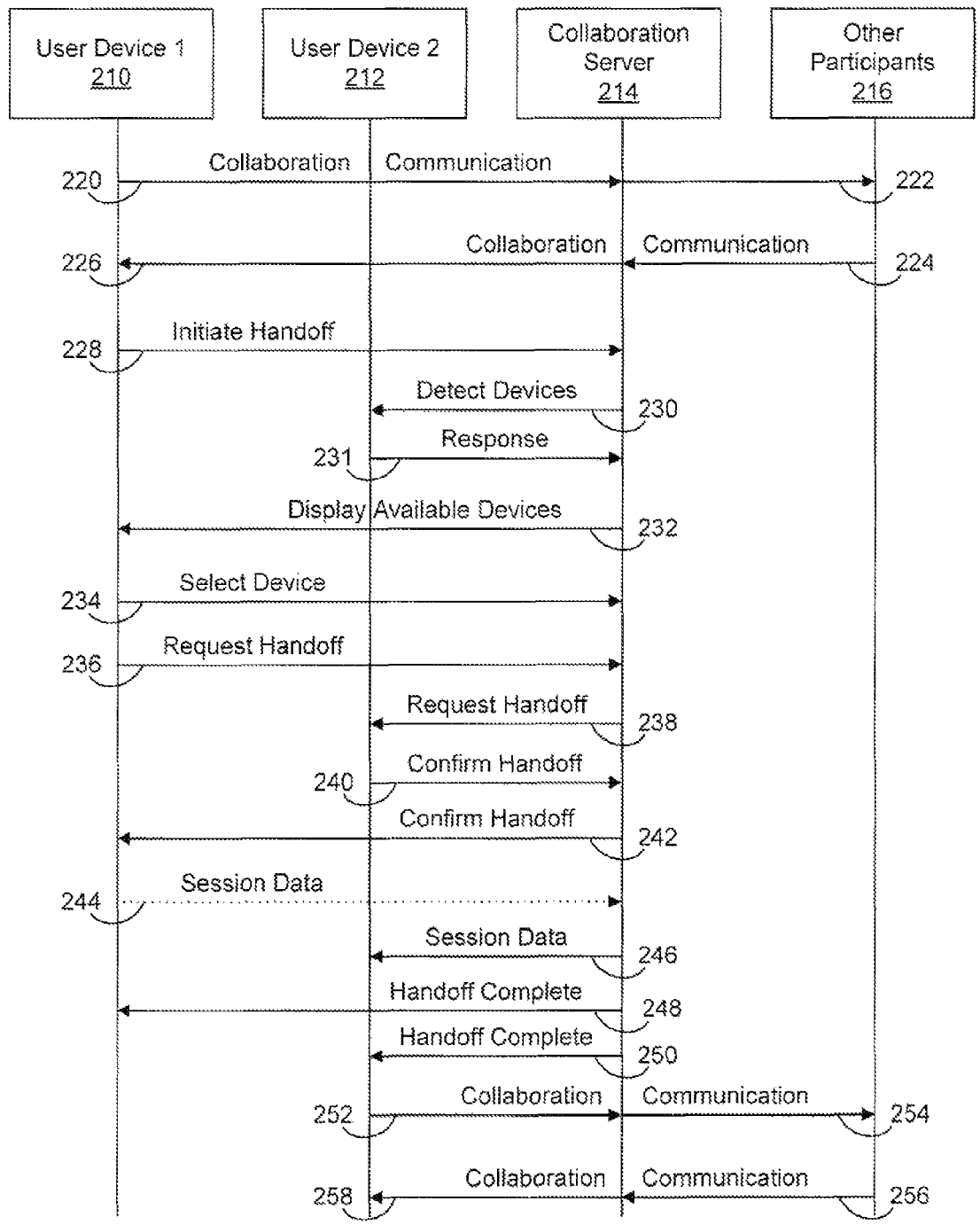
FIG. 2 illustrates a message sequence chart for handing off a collaboration session from one device to another in accordance with an embodiment of the present invention.

Referring to FIG. 2, a message sequence chart for a collaboration session handoff is illustrated in accordance with an example of the present technology. The sequences illustrated are sequences between multiple user client devices (i.e., User Device1 210 and User Device2 212), a collaboration server 214 and other participants 216.

The sequence chart begins at 220 where a collaboration communication is sent from User Device 1 to the collaboration server, which is then relayed 222 to the other participants. The other participants may in turn reply 224 with a collaboration communication which is then relayed 226 from the collaboration server to User Device 1. This example may presume the establishment of the collaboration session before the illustrated sequences begin.

At some point during the collaboration session, the user at User Device 1 may wish to transfer the collaboration session or access to the collaboration session to User Device 2 in a manner invisible to the other participants. The user may initiate 228 the handoff procedure by initiating a handoff option via a graphical user interface (GUI) provided on User Device 1 by the collaboration server. For example, the user may select the handoff option by clicking a button, selecting an item from a dropdown list, selecting a radio button, providing voice commands or gestures and so forth.

After receiving a request to initiate the handoff from User Device 1, the collaboration server may detect 230 available devices for the user. For example, the user may have registered a list including a name and network address of the devices in advance of the request to hand off the collaboration session. The collaboration server may attempt to ping the registered devices to determine whether the devices are currently available for handoff. The device(s) may send a response 231 to indicate availability of the device for handoff. In another aspect, the collaboration server may store information relating to devices currently logged on to the server and may simply provide the devices logged on list to the user without detecting devices or otherwise eliciting a response from devices. The collaboration server may access the list and display 232 the list to the user as options from which to select the new device to which the session is to be transferred.

In one example, the collaboration server may analyze server logs to determine whether any other devices are currently accessing the collaboration server with the user's credentials. In other words, the collaboration server may determine other current instances of the user account being logged into the server and identify the devices associated with these other instances. As another example, rather than detecting devices, the collaboration server may provide a unique network address, such as including an access token for accessing the collaboration server, to enable the user to input the unique network address on the new client device to access the collaboration session. As another example, the collaboration server may request that the user provide an email address to which the request may be sent. The user may access the user's email via the new device and join the collaboration session via the request sent by the collaboration server.

In examples where the collaboration server identifies available client devices according to currently online or logged in devices, the user may simply select to join the collaboration session and be immediately joined to the collaboration session. For examples where the new client device is not necessarily online or logged in to the collaboration server, as an added security measure, the collaboration server may optionally request that the user input security credentials to gain access to the collaboration session.

Upon display of options from which the user may select 234 the new device to receive the collaboration session, the user may make the selection of the new device and may request handoff 236 of the current collaboration session to the new device. The collaboration server may submit the request 238 to the new device, User Device 2, which may be accepted or rejected at User Device 2. If the user at User Device 2 confirms 240 or accepts the handoff request, the handoff confirmation may be relayed 242 from the collaboration server to User Device 1.

Local session data, if available, may be transmitted 244 from User Device 1 to the collaboration server. Server session data, if available, may be combined with any session data from User Device 1 and transferred 246 to User Device 2. In another example, server session data may remain at the server while local session data is transferred between devices. While to the user and the other participants the transfer of the collaboration session between devices may appear to in fact be the same collaboration session instance as before the transfer, the collaboration session may optionally create a new participant token for User Device 2 but suppress announcements, notifications and the like from the collaboration session due to the manner in which the session was transferred. As pertaining to server session data remaining at the server, the server session data may be copied to or associated with the new participant instance.

Non-limiting examples of local and/or server session data that may be sent to the new client or otherwise made available when the new client joins the collaboration session may include audio settings, video settings, collaboration settings, public and private chat history and so forth. The user may not be prompted to re-announce the user's name or to enter a PIN number or other form of security credentials. The other participants in the collaboration session will not hear an entry tone or exit tone from the user entering the collaboration session with the new device or exiting the collaboration session with the original device.

If the user was currently muting the user's audio input (as an example of local session data) or if the leader of the collaboration session was muting the user's audio (as an example of server collaboration data), then the audio state will not change for the user on the new client device. As another example, if the user was muting their user's video input before the handoff or the user was muting the video of another participant, then the video state will not change after the handoff. If the user had a specific video layout, then the video layout will not change. If the user was recording the collaboration session on the collaboration server, then the collaboration server will continue to record the conference. If the user was recording the conference locally, then the user may be warned that handing off the conference will terminate the recording and recommend that the user start recording at the new client. In one example, the recording of the local conference on the original device may be terminated and recording of the conference at the new device may be automatically initiated as part of the transfer of settings from one device to another. As another example, when a local recording is split between two devices, one of the devices may be configured to automatically transmit the local recording to the other device during or after the collaboration session and to automatically merge the two local recordings into a single continuous recording.

After the session data is transferred, the handoff may be indicated as completed 248, 250 to User Device 1 and User Device 2. User Device 1 may be optionally disconnected from the collaboration session when the handoff is completed. The user may proceed to collaborate 252, 254, 256, 258 with the other participants via the collaboration server similarly as before the transfer of the collaboration session between devices.

Figure 3A:
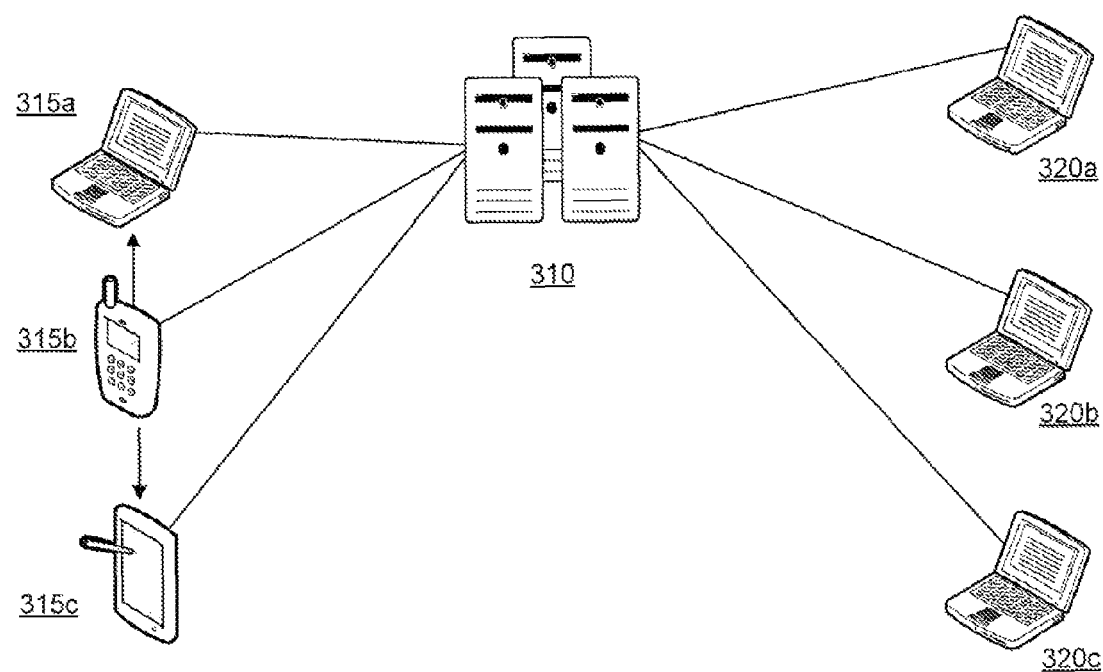
FIG. 3a illustrates a block diagram of a collaboration session handoff in accordance with an embodiment of the present invention.
Figure 3B:
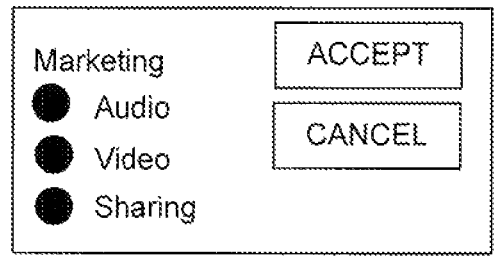
FIGS. 3b-3d illustrate user interfaces presented to users at devices to initiate, accept and cancel handoff requests for handing off a collaboration session between devices in accordance with embodiments of the present invention.

Referring to FIG. 3a, an alternate implementation of the technology may be as follows. Rather than performing the handoff as a push from an original device 315b to a new device 315a or 315c, the handoff may be performed as a pull from the new device to the original device. For example, the user can select a handoff pull option on the new client device. The new client may send a collaboration list request to the collaboration server 310 requesting collaborations the user may be permitted to join. The server may return a list of one or more collaboration sessions, which may include a list of different components of the session (e.g., audio, video, chat, sharing, etc.). The new client may present the user at the new client with a list of session components along with the name of the session, as illustrated in FIG. 3b. This list may include multiple collaboration sessions along with components from multiple clients. The user may select a desired session, along with the component(s) they wish to handoff or pull to the new client device. The new client may send a handoff request to the server including the desired session and component(s).

Figure 3C:
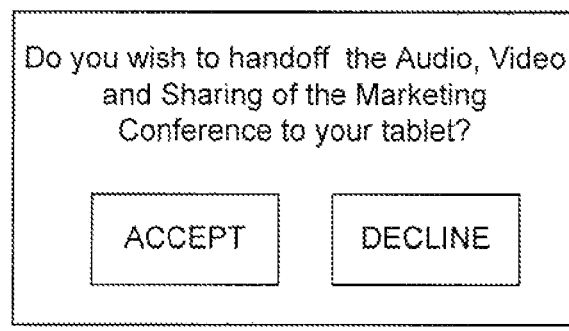

The collaboration server 310 may send a handoff request to the device(s) 315b along with the requested components. The original client 315b may prompt the user to accept or decline the handoff, where the prompt may include the name of the session and the components to be handed off as illustrated in FIG. 3c. By prompting the original client to confirm the handoff, a nefarious individual may be prevented from stealing the collaboration session from the user without the user acknowledging the handoff. For example, the nefarious individual may wish to hijack a collaboration session in which sensitive or classified information is being used. For example, the nefarious individual may have access to a client device through which the user is logged into the server. The nefarious individual may be prevented from accessing the collaboration session by requesting the original client to approve the handoff before the new client can take control.

Figure 3D:
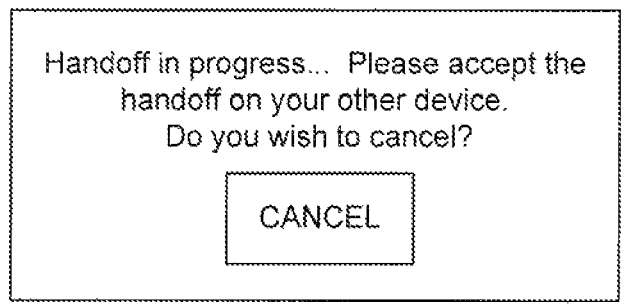

The user on the new client 315a or 315c may receive a prompt that indicates the handoff is in progress and to accept the handoff on the other device 315b. The prompt may further enable the user to cancel the handoff as illustrated in FIG. 3d.

If the user on the original client 315b selects to accept the hand off, then the original client may send an acknowledgement message to the collaboration server 310. The collaboration server may send the new client 315a or 315c an acknowledgement message. The original client may send local session data to the server. The server may optionally combine the original client's session data with server session data and sends the combined session data to the new client. The new client may send the server a message to indicate that the handoff was successful. The server may subsequently send the old client a message to indicate that the handoff was successful.

In another embodiment also described with respect to FIG. 3a, the transmission of session data from one device to another may be specific to session data related to the portion of the collaboration session being transferred. For example, when the user selects the destination 315a or 315c of the handoff, the user may also choose to handoff one or more components of the collaboration session (e.g., audio, video, chat, sharing, etc.) to the new destination instead of the entire session. When the new client 315a or 315c receives the handoff request the individual components may be indicated in the prompt so that the user knows which components they are handing off to the new client. Session data transferred between devices may be specific to the components transferred between the specific devices. For example, a user may select to transfer an audio portion of the collaboration session from a smartphone 315b to a tablet 315c and a video portion of the collaboration session from the smartphone to a laptop computing device 315a. In other words, aspects of session data relevant to audio may be transferred to the tablet and aspects of session data relevant to video may be transferred to the laptop.

The original client 315b may retain one or more portions of the collaboration session. For example, the audio component of the collaboration session may be transferred to a different device while a video component of the collaboration session may be retained at the original client.

As another variation, components of a collaboration session which have been divided among multiple client devices may be rejoined at a single device. For example, where an audio component and a video component have been transferred to different devices, one or more devices may be used to pull the components to a single device, such as to one of the devices to which the components were transferred or to a different device from which the pull request may originate. In one aspect, a collaboration session component may be pushed from a device to another device. In another aspect, a collaboration session component at a first device may be pushed to a second device and the first device may be used to submit a pull request to pull the collaboration session component from a third device to the first or second devices. Additional variations not explicitly described here may be recognized by one having skill in the art and are considered to be within the scope of this disclosure.

Figure 4:
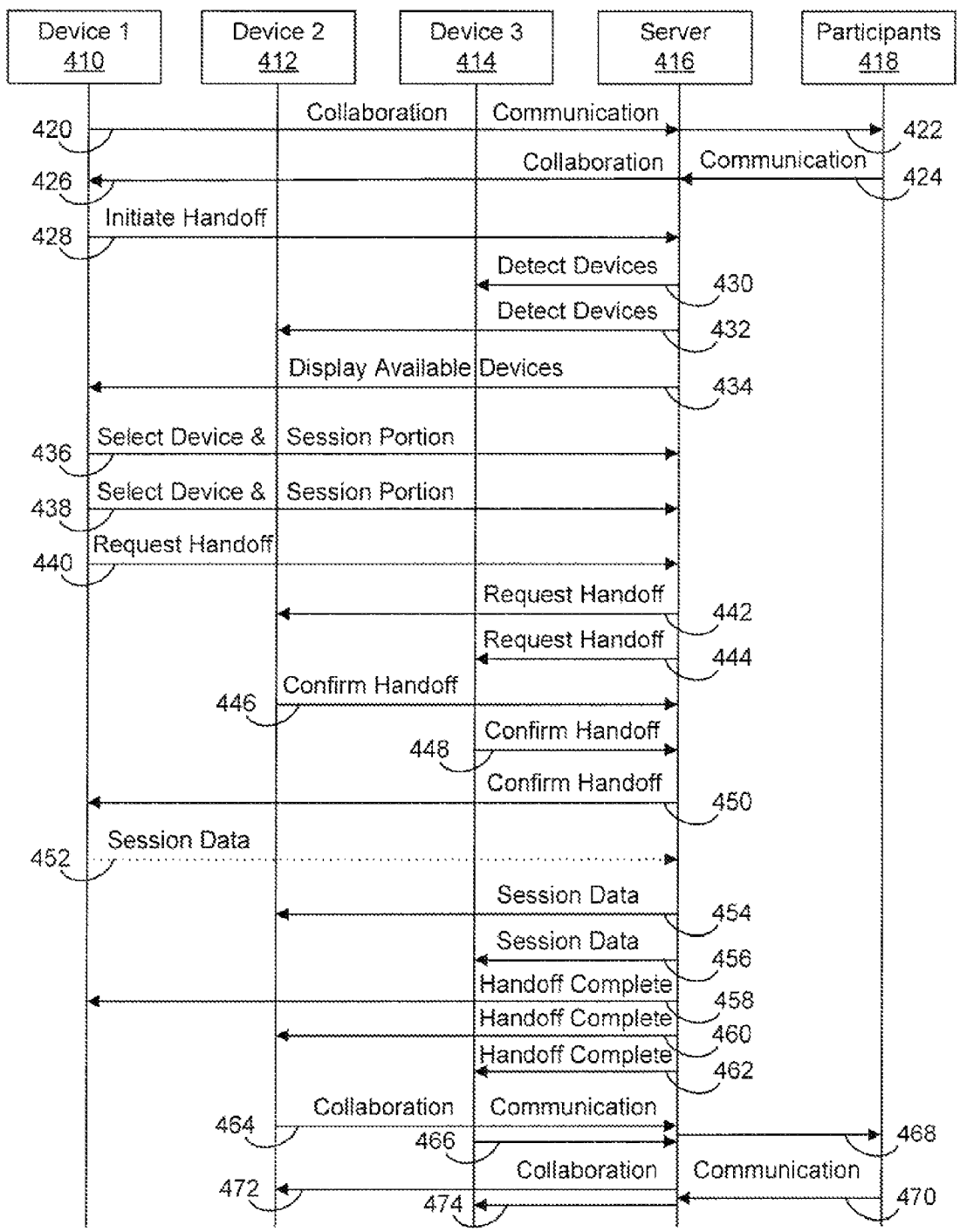
FIG. 4 illustrates a message sequence chart for handing off a collaboration session from one device to multiple other devices in accordance with an embodiment of the present invention.

Referring now to FIG. 4, a sequence message chart for handing off components of a collaboration session is illustrated in accordance with an example of the present technology. The sequences illustrated are sequences between multiple user client devices (i.e., Devices 1-3 410, 412, 414), a collaboration server (i.e., Server 416) and other participants 418.

The sequence chart begins at 420 where a collaboration communication is sent from Device 1 to the server, which is then relayed 422 to the other participants. The other participants may in turn reply 424 with a collaboration communication which is then relayed 426 from the server to Device 1. This example may presume the establishment of the collaboration session before the sequences illustrated begin.

At some point during the collaboration session, the user at Device 1 may wish to transfer one or more components of the collaboration session to one or more other devices in a seamless manner invisible to the other participants. The user may initiate 428 the handoff procedure by initiating a handoff option via a graphical user interface (GUI) provided on Device 1 by the collaboration server. For example, the user may select the handoff option by clicking a button, selecting an item from a dropdown list, selecting a radio button, providing voice commands or gestures and so forth.

After receiving a request to initiate the handoff from Device 1, the server may detect 430, 432 available devices for the user. The server may further detect components of the collaboration session which are separable and which may be handed off to different devices. The server may access the list and display 434 the list to the user as options from which to select the new device to which one or more session components are to be transferred.

Upon display of options from which the user may select the new device to receive a selected component of the collaboration session, the user may make the selection 436 of a first new device and a selection 438 of a second new device, along with desired collaboration session components to share with the specified new device. The user may request handoff 440 of the identified collaboration session component to the new device. The collaboration server may submit the request 442, 444 to the new devices (i.e., Devices 2 and 3), which may accept or reject the request. If the user at either of Devices 2 or 3 confirms 446, 448 or accepts the handoff request, the handoff confirmation may be relayed 450 from the server to Device 1.

Local session data, if available, may be transmitted 452 from Device 1 to the server. Server session data, if available, may be combined with any session data from Device 1 and transferred 454, 456 to Device 2 and/or 3. As with previous examples, server session data may remain at the server while local session data is transferred between devices or may be combined and transferred with the local session data. Where session data is directed to multiple different devices selected for different components of the collaboration session, the session data transferred to each of the devices may be tailored to the type or component of the collaboration session transferred to the device. For example, if an audio component of a session is transferred to a device (such as a telephone) without other components, the collaboration server may not send chat or other non-audio session data. Similarly, if a document interaction portion of a collaboration session is transferred to a device (such as a laptop computing device) without an audio component, the collaboration server may not send participant muting or other related audio session data to the device.

After the session data is transferred to Devices 2 and 3, the handoff may be indicated as completed 458, 460, 462 to Devices 1-3. User Device 1 may be optionally disconnected from the collaboration session when the handoff is completed. The user may proceed to collaborate 464, 466, 468, 470, 472, 474 with the other participants via the server similarly as before the transfer of the collaboration session between devices, with the added difference that the collaboration session is now being conducted using multiple devices.

Figure 5:
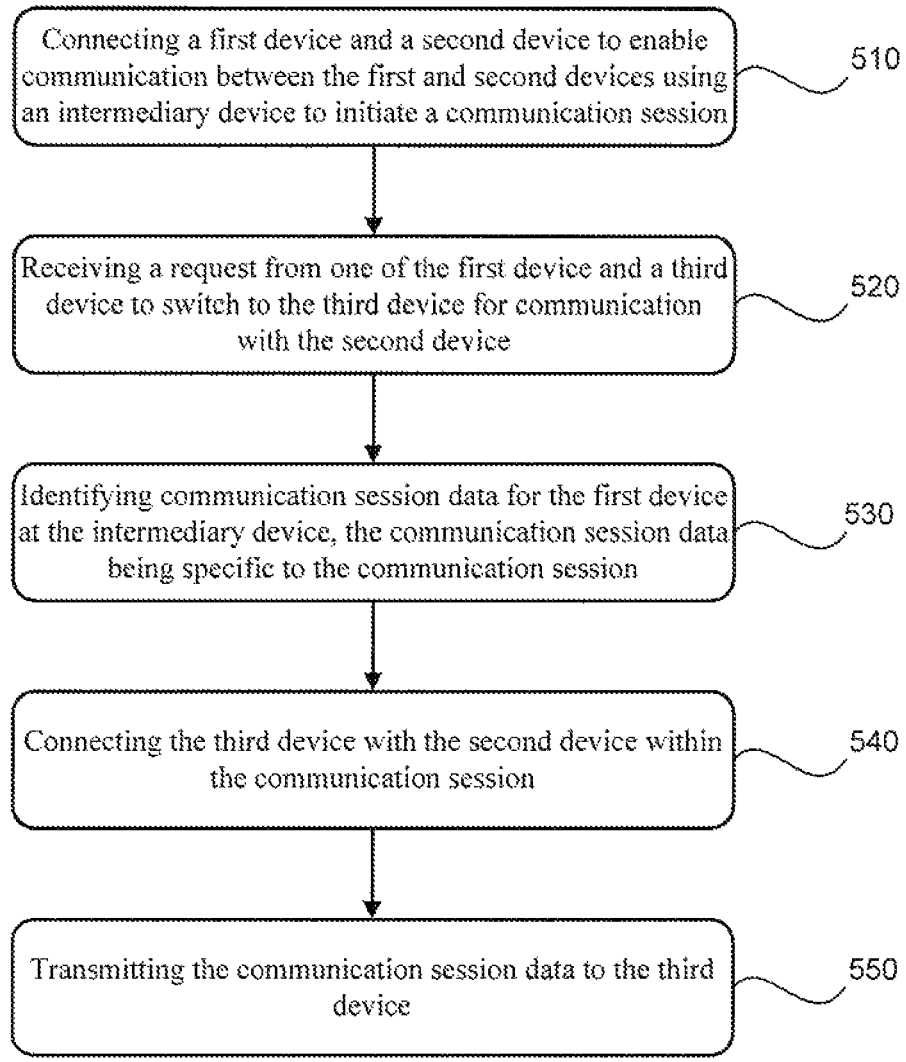
FIG. 5 illustrates a flow diagram of a method for seamlessly passing a communication session between devices in accordance with an embodiment of the present invention.

Referring to FIG. 5, a flow diagram of a method for seamlessly passing a communication session between devices is illustrated in accordance with an example of the present technology. The method may include connecting 510 a first device and a second device to enable communication between the first and second devices using an intermediary device to initiate a communication session. In one aspect, the method may be implemented without the intermediary device by transferring session data directly from one device to another.

The method may further include receiving 520 a request from one of the first device and a third or new device to switch to the third device for communication with the second device. In other words, the first device may submit a push request to push the communication (i.e., the collaboration session) to the third device, or alternately the third device may submit a pull request to pull the communication from the first device to the third device. The request may include a request for an entire collaboration session or for one or more components of the collaboration session.

The method may include identifying 530 communication session data for the first device at the intermediary device, the communication session data being specific to the communication session. The communication session data for the first device may be local session data sent from the first device to the intermediary device (i.e., the collaboration server). In another example, the communication session data may be server session data pertaining specifically to the first device or generally to a collaboration session in which the first device is involved.

The method may include connecting 540 the third device with the second device within the communication session. In other words, the server may facilitate the connection of and communication between the devices by hosting a collaboration session and allowing the third device to join the collaboration session which is currently accessed by the second device. Once the devices are connected, or at least once the third device has indicated an intention to join the collaboration session, the method may include transmitting 550 the communication session data to the third device. Communications in the communication session may then be transmitted between the second and third devices as with communications between the first and second devices before the handoff of the session from the first device to the third device.

The communication session data may include any of a variety of different types of data, some non-limiting examples of which include a communication history between the first and second devices during the communication session, communication settings for the first device, or communication settings for the intermediary device specific to communications to or from the first device.

The first device may optionally be disconnected from the communication session after the third device successfully joins the session. In one example, however, the method may include sharing the communication session with the second device between the first and third devices. For example, a first type of communication data may be transmitted to the first device and a second type of communication data may be transmitted to the third device. Some example types of communication data which may be identified and which may be sent to different devices may include audio or voice data, image or video data, and collaboration data.

The communication session described by the method may be any type of communication session and may involve any one or more types of communication data. For example, the communication session may be a telephone call such as between two parties (or devices) or a conference call between three or more parties (or devices). In this example, the intermediary device may be a telephone switch or server capable of transferring session data pertaining to the phone call to the third device, including potentially receiving session data from the first device and combining the first device session data with any server session data. The communication session may be more complex, such as an audio-visual collaboration session.

Figure 6:
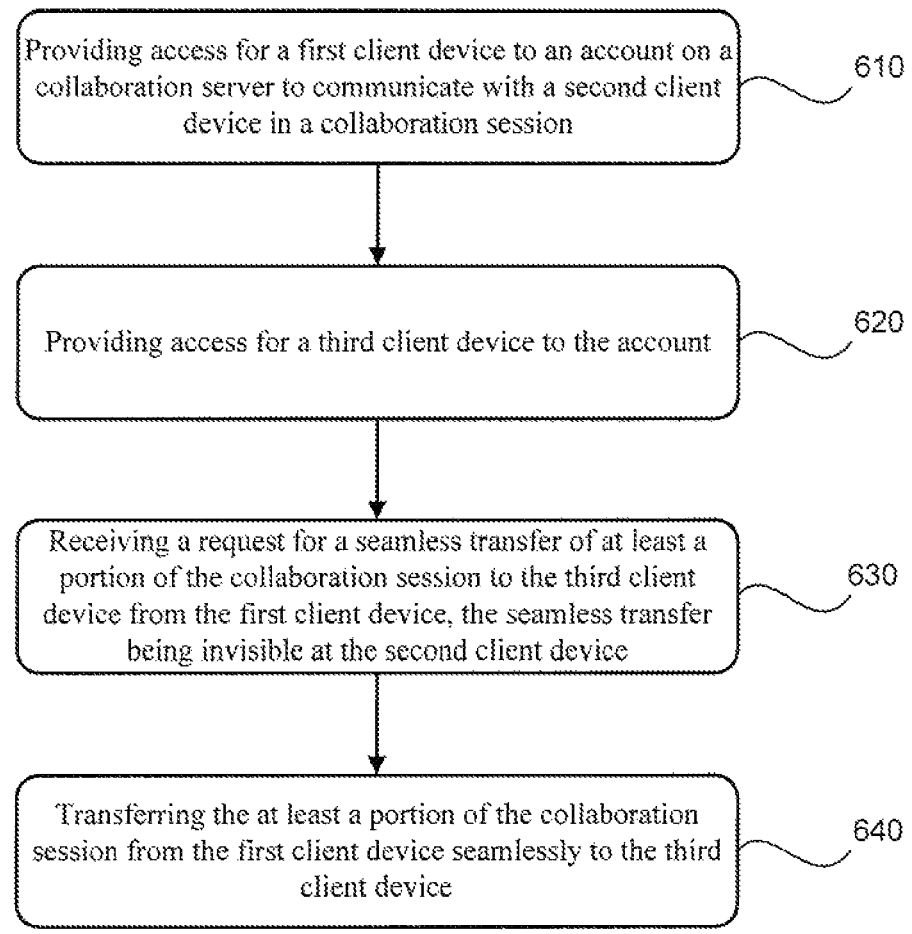
FIG. 6 illustrates a flow diagram of a collaboration method in accordance with an embodiment of the present invention.

Referring to FIG. 6, a flow diagram of a collaboration method is illustrated in accordance with an example of the present technology. The method may include providing 610 access for a first client device to an account on a collaboration server to communicate with a second client device in a collaboration session. In other words, the collaboration server may permit the first client device to access an account on the collaboration server and the collaboration session, as well as to communicate with other participants when a user at the first device provides credentials to authenticate the user or the first client device. Similarly, access to the account may be provided 620 to any number of other client devices for the user upon presentation of appropriate credentials. For example, the user may access the account using a third device.

The collaboration server may receive 630 a request for a seamless transfer of at least a portion of the collaboration session to the third client device from the first client device. A seamless transfer may be a transfer or handoff which is invisible at the second client device and/or which enables access to the collaboration session by the third client device without first entering a passcode or other credentials specific to the collaboration session. The request for the seamless transfer may be a request to transfer or hand off an entire collaboration session or one or more components of the collaboration session. In one example, the request may comprise multiple successive requests for different components of the collaboration session. In another example, the request may comprise multiple substantially simultaneous request for the different components of the collaboration session. In yet another example, the request may comprise a single request designating multiple components of the collaboration session for multiple client devices.

The method may include transferring 640 the at least a portion of the collaboration session from the first client device to the third client device. As described above, the entire collaboration session may be transferred or alternately less than an entire collaboration session may be transferred. In one aspect, rather than transferring the collaboration session or a portion thereof, the method may include sharing the collaboration session among devices. Specifically, one or more components of the collaboration session may be simultaneously accessible by multiple devices (such as simultaneously viewing a same video stream on the first and third devices, for example).

The method may further include receiving the request from the first client device and requesting a confirmation of the request from the third client device. Alternatively, the method may include receiving the request from the third client device and requesting a confirmation of the request from the first client device. In other words, the method may embody push and/or pull mechanisms for handing off the session data between devices.

Figure 7:
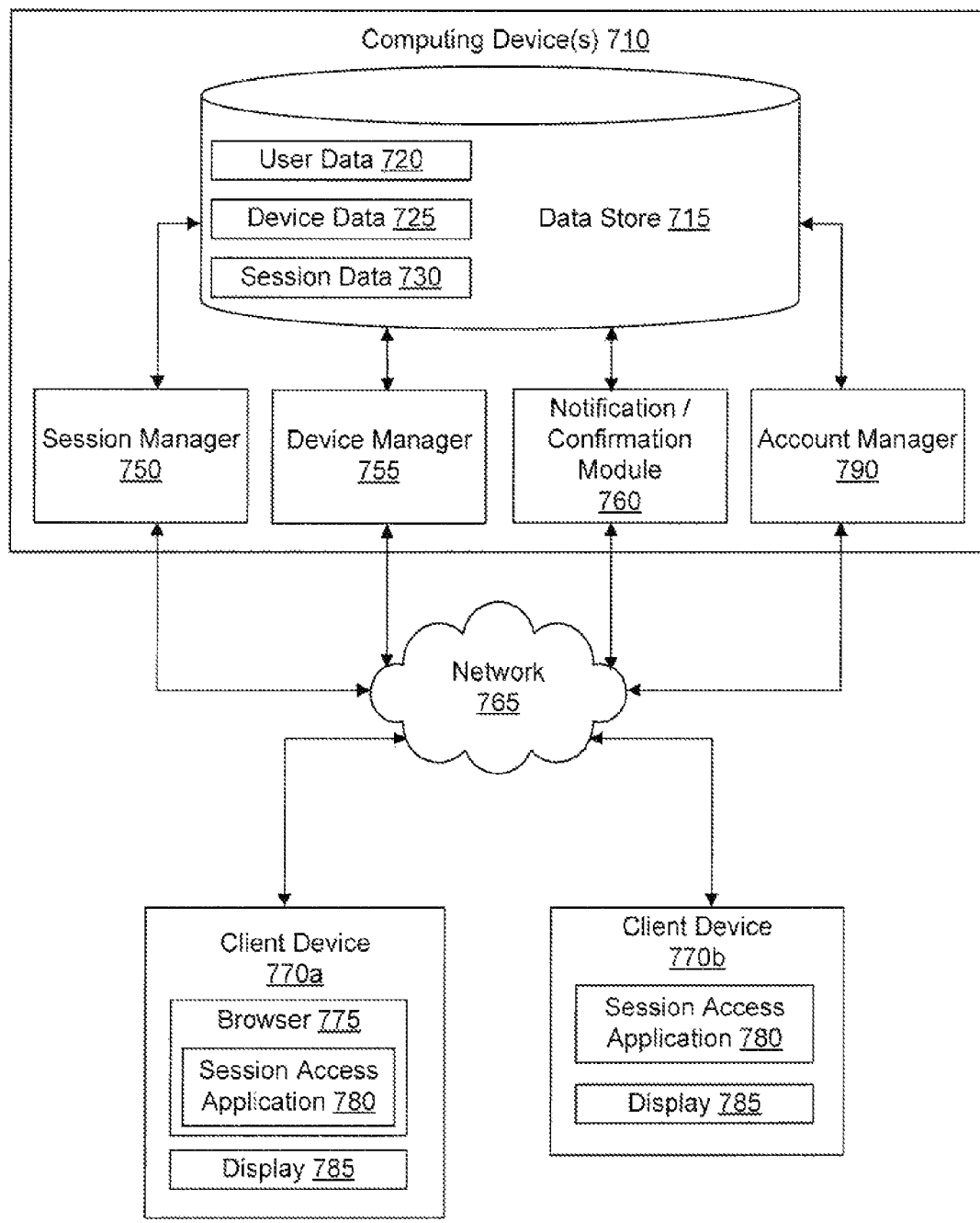
FIGS. 7-8 illustrate block diagrams of communication handoff systems in accordance with embodiments of the present invention.

Referring to FIG. 7, a block diagram of a communication handoff system is illustrated in accordance with an example of the present technology. The system may be implemented across one or more computing device(s) 710, 770a-b connected via a network 765. For example, a computing device 710 may include a data store 715 and various modules such as a session manager 750, a device manager 755, a notification and/or confirmation module 760 and an account manager 790 executable by a processor of the computing device 710. The data store 715 may include multiple data stores for storing user data 720, device data 725, session data 730 and so forth.

The computing device 710 may include a collaboration server configured to host a collaboration session between multiple parties. In one aspect, the collaboration server may comprise a plurality of collaboration servers in communication with one another. For example, a first of the collaboration servers may be configured to host an account manager for the multiple parties in the collaboration session and a second of the collaboration servers may be configured to host the actual collaboration session. In other words, the first collaboration server may act as a gatekeeper to verify credentials for account access or to accept passcodes or the like specific to a collaboration session.

The session manager 750 may be available for managing the collaboration session individually for the multiple parties. In other words, the session manager 750 may initiate a collaboration session, terminate a collaboration session, enable one or more different types of communication or components for the collaboration session, track the users in the collaboration session and so forth. The session manager 750 may comprise a network page module configured to provide a network page for display on the client devices, such as may include a user authentication page or a collaboration page. The network page module may enable input from a user for navigating network pages, interacting with other participants in the collaboration session, changing collaboration session settings and so forth. The network page module may provide pages for display which include other participant information, available device information, handoff status information and so forth.

The device manager 755 may be configured to enable a party to transfer the collaboration session between client devices 770a, 770b in communication with the collaboration server 710 such that the transfer is unnoticeable by other of the multiple parties. Transfer of the access may include a transfer of at least one of collaboration session data and collaboration session settings established before the transfer. The collaboration session data may include, for example, a chat history, and the collaboration session settings may include, for example audio settings.

The device 755 manager may be configured to enable transfer of less than full access to the collaboration session such that access to portions of collaboration session are split between the client devices 770a, 770b. The device manager 755 may be in communication with the session manager to cause the client devices between which access to the portions of the collaboration session is split to appear as a single device. In other words, while the collaboration server may recognize the multiple devices and provide communications to the multiple devices accordingly, a single instance of the user or user access may be displayed to participants in the collaboration session.

The notification/confirmation 760 module may be configured to notify one or more of the client devices 770a-770b for the individual of the multiple parties of the communication transfer. The notification/confirmation module 760 may be further configured to confirm the transfer with one or more of the client devices 770a-770b for the individual of the multiple parties.

The account manager 790 may be configured to manage accounts for the multiple parties and configured to enable transfer of access to the collaboration session when the client devices for the individual of the multiple parties are simultaneously logged in to the system.

The network page module 790 may be configured to provide pages for display with any suitable technology incorporated therein, such as the ability to sort information displayed on the page, the ability to modify the page to accommodate various devices accessing the page, and so forth. Thus, regarding the network page module, as well as any other module described herein, the capabilities, features and functionality of the module are not limited to the description provided and may encompass a broad variety of other capabilities, features and functionality not described.

The network page module may access data in the catalog data store 715 for providing search results, user information, device information, session information and other network page data for display on the client device(s) 770a, 770b.

The user data store 720 may be available to store user data, such as names, identification information, user credentials, permissions and so forth. The device data store 725 may store device information including device names, model numbers, permissions, capabilities and so forth. The session data store may store session data, such as participants, history, settings and so forth. The various data stores 720-730 may include, for example, text, images, video and so forth, and may optionally be structured for suitable display on a client device 770a or 700b, such as in the form of a webpage or website.

The modules that have been described may be stored on, accessed by, accessed through, or executed by a computing device 710. The computing device 710 may comprise, for example, a server computer or any other system providing computing capability. Alternatively, a plurality of computing devices may be employed that are arranged, for example, in one or more server banks, blade servers or other arrangements. For example, a plurality of computing devices together may comprise a cloud computing resource, a grid computing resource, and/or any other distributed computing arrangement. Such computing devices may be located in a single installation or may be distributed among many different geographical locations. For purposes of convenience, the computing device 710 is referred to herein in the singular form. Even though the computing device 710 is referred to in the singular form, however, it is understood that a plurality of computing devices may be employed in the various arrangements described above.

Various applications and/or other functionality may be executed in the computing device 710 according to various embodiments, which applications and/or functionality may be represented at least in part by the modules that have been described. Also, various data may be stored in a data store 715 that is accessible to the computing device 710. The data store 715 may be representative of a plurality of data stores as may be appreciated. The data stored in the data store 715, for example, is associated with the operation of the various applications and/or functional entities described. The components executed on the computing device 710 may include the modules described, as well as various other applications, services, processes, systems, engines or functionality not discussed in detail herein.

The term "data store" 715 may refer to any device or combination of devices capable of storing, accessing, organizing and/or retrieving data, which may include any combination and number of data servers, relational databases, object oriented databases, simple web storage systems, cloud storage systems, data storage devices, data warehouses, flat files and data storage configuration in any centralized, distributed or clustered environment. The storage system components of the data store may include storage systems such as a SAN (Storage Area Network), cloud storage network, volatile or non-volatile RAM, optical media or hard-drive type media.

The client devices 770a, 770b shown in FIG. 7 are representative of a plurality of client devices that may be coupled to the network. The client devices may communicate with the computing device over any appropriate network, including an intranet, the Internet, a cellular network, a local area network (LAN), a wide area network (WAN), a wireless data network or a similar network or combination of networks.

Each client device 770a, 770b may be embodied, for example in the form of a client computer, a desktop computer, a laptop computer, a mobile device, a hand held messaging device, a set-top box, heads up display (HUD) glasses, a car navigation system, personal digital assistants, cellular telephones, smart phones, set-top boxes, network-enabled televisions, music players, web pads, tablet computer systems, game consoles, electronic book readers or other devices with like capability, including capabilities of receiving and presenting content from a server. Each client device 770a, 770b may include a respective display 785. The display 785 may comprise, for example, one or more devices such as cathode ray tubes (CRTs), liquid crystal display (LCD) screens, gas plasma based flat panel displays, LCD projectors, or other types of display devices, etc.

Each client device 770a, 770b may be configured to execute various applications such as a browser 775, a respective page or session access application 780 for a collaboration session application and/or other applications. The browser 775 may be executed in a client device 770, for example, to access and render network pages, such as web pages or other network content served up by the computing device 710 and/or other servers. The content access application is executed to obtain and render for display content features from the server or computing device 710, or other services and/or local storage media.

In some embodiments, the session access application 780 may correspond to code that is executed in the browser 775 or plug-ins to the browser 775. In other embodiments, the session access application 780 may correspond to a stand-alone application, such as a mobile application. The client device 770 may be configured to execute applications beyond those mentioned above, such as, for example, mobile applications, email applications, instant message applications and/or other applications. Users at client devices 770 may access content features through content display devices or through content access applications 780 executed in the client devices 770.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 8:
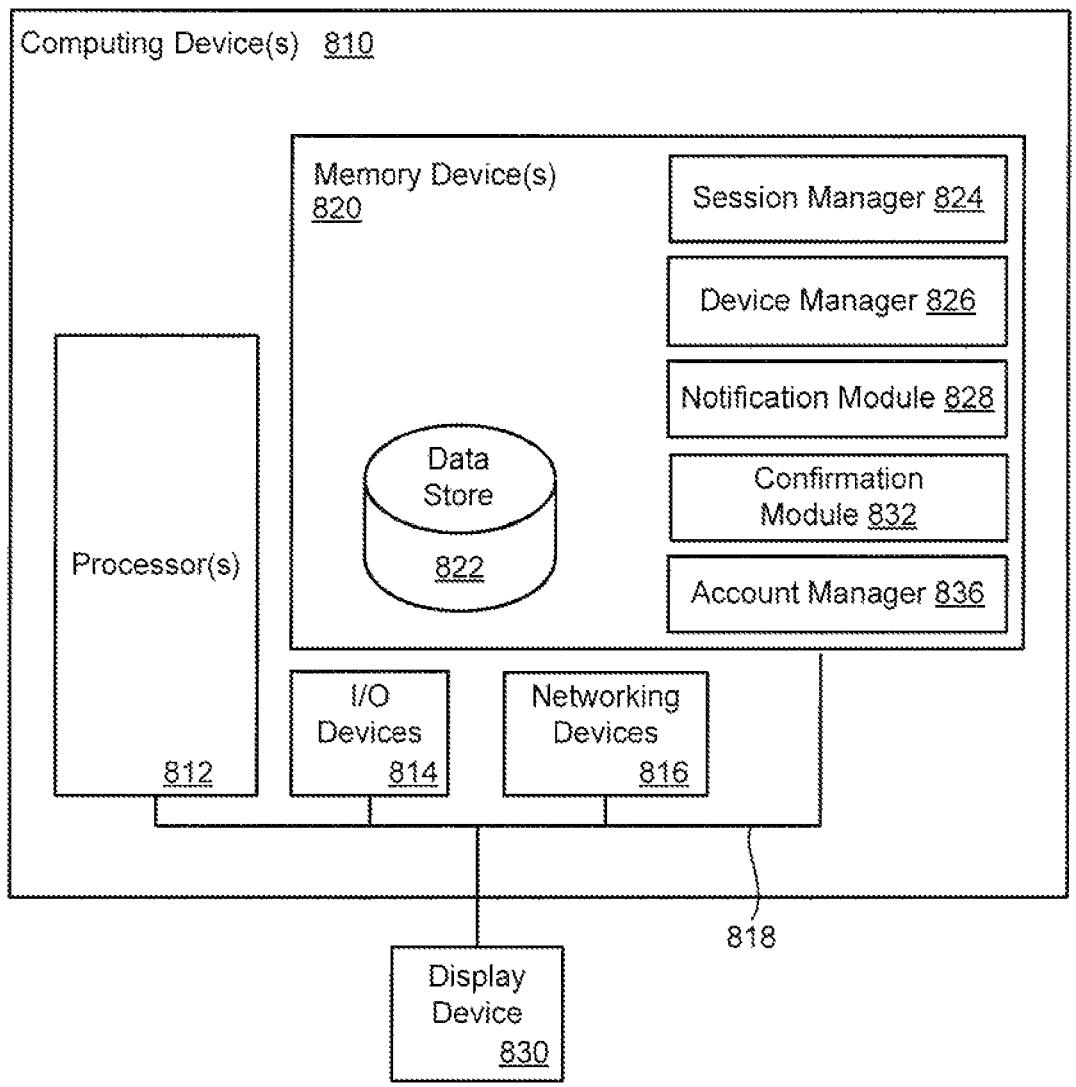

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules that are executable by the processor(s) and data for the modules. Located in the memory device 820 are modules executable by the processor. For example, a session manager module 824, a device manager module 826, a notification module 828, a confirmation module 832 and an account manager module 836, as well as other modules, may be located in the memory device 820. A data store 822 may also be located in the memory device 820 for storing data related to the modules and other applications along with an operating system that is executable by the processor(s) 812.

The computing system 810 of FIG. 8 may be used to perform the various operations described regarding other systems and methods previously herein.

The computing device 810 may further include or be in communication with a display device 830. The display device 830 may enable an administrator to view information available regarding users, collaboration sessions and so forth, and to interface with the collaboration server to manage user account information, collaboration sessions and so forth.

Various applications may be stored in the memory device 820 and may be executable by the processor(s) 812. Components or modules discussed in this description that may be implemented in the form of software using high programming level languages that are compiled, interpreted or executed using a hybrid of the methods.

The computing device 810 may also have access to I/O (input/output) devices 814 that are usable by the computing devices. An example of an I/O device 814 is the display device 830 that is available to display output from the computing devices. Other known I/O device may be used with the computing device as desired. Networking devices 816 and similar communication devices may be included in the computing device 810. The networking devices 816 may be wired or wireless networking devices 816 that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor 812. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:
1. A method for seamlessly passing a communication session between devices, comprising:
  connecting a first device and a second device to enable communication between the first and second devices using an intermediary device to initiate a communication session;
  receiving a request from one of the first device and a third device to switch to the third device for communication with the second device;
  identifying communication session data for the first device at the intermediary device, the communication session data being specific to the communication session, and including communication settings for at least one of the first device and the intermediary device specific to communications to or from the first device, the communication settings comprising at least one of (i) user mute settings and (ii) user recording status;

connecting the third device with the second device within the communication session;

transmitting the communication session data including the communication settings to the third device, so that the communication settings from the first device are maintained on the third device after the switch to the third device;

sharing the communication session with the second device between the first and third devices; and causing the first and third devices to appear as a single device at the intermediary device.

2. The method as in claim 1, further comprising disconnecting the first device from the communication session.

3. The method as in claim 1, wherein the communication session data includes a communication history between the first and second devices during the communication session.

4. The method of claim 1, wherein sharing the communication session between the first and third devices comprises transmitting a first type of communication data to the first device and a second type of communication data to the third device, types of communication data being selected from the group consisting of: audio or voice data, image or video data, and collaboration data.

5. The method of claim 1, wherein the communication session is a telephone call.

6. The method of claim 1, wherein the communication session is an audio-visual collaboration session.

7. The method of claim 1, further comprising:
providing access for the first client device to an account on the intermediary device; and
providing access for the third client device to the account.

8. The method of claim 7, wherein receiving the request further comprises one selected from the group consisting of:
receiving the request from the first client device and requesting a confirmation of the request from the third client device; and
receiving the request from the third client device and requesting a confirmation of the request from the first client device.

9. A communication handoff system, comprising:
a server configured to host a collaboration session between multiple parties;
a session manager on the server for managing the collaboration session individually for the multiple parties; and
a device manager configured to enable a party to transfer the collaboration session between client devices in communication with the collaboration server such that the transfer is unnoticeable by other of the multiple parties;
wherein transfer of the collaboration session includes transmitting communication session data, the communication session data including communication settings for at least one of a first of the client devices and the server specific to communications to or from the first of the client devices so that the communication settings are maintained on another of the client devices after the transfer, the communication settings comprising at least one of (i) user mute settings and (ii) user recording status;
wherein the device manager is configured to enable transfer of less than full access to the collaboration session such that access to portions of collaboration session are split between the client devices; and
wherein the device manager is in communication with the session manager to cause the client devices between which access to the portions of the collaboration session is split to appear as a single device.

10. The system of claim 9, wherein the communication session data includes at least one of a chat history, audio and video settings.

11. The system of claim 9, further comprising a notification module configured to notify one or more of the client devices for the individual of the multiple parties of the communication transfer.

12. The system of claim 9, further comprising a confirmation module configured to confirm the transfer with one or more of the client devices for the individual of the multiple parties.

13. The system of claim 9, further comprising an account manager for managing accounts for the multiple parties and configured to enable transfer of access to the collaboration session when the client devices for the individual of the multiple parties are simultaneously logged in to the system.

14. The system of claim 9, wherein the server comprises a plurality of collaboration servers in communication with one another, wherein a first of the collaboration servers is configured to host an account manager for the multiple parties and a second of the collaboration servers is configured to host the collaboration session.

* * * * *